United States Patent Office 3,070,598

Patented Dec. 25, 1962

3,070,598
METHOD OF PREPARING PHENOTHIAZINE-10-CARBOXYLIC ACID CHLORIDE

Phillip Adams and Sidney Beinfest, Berkeley Heights, N.J., assignors to Berkeley Chemical Corporation, Berkeley Heights, N.J., a corporation of New Jersey No Drawing. Filed May 29, 1959, Ser. No. 816,665
3 Claims. (Cl. 260—243)

This invention relates to an improved method of preparing phenothiazine-10-carboxylic acid chloride. More particularly it relates to a method of preparation utilizing controlled amounts of a solvent for the phenothiazine.

Phenothiazine-10-carboxylic acid chloride, a chemical intermediate for pharmaceuticals, has been prepared in a variety of ways, all based on the reaction between phosgene and phenothiazine. Thus HCl acceptors such as various amines have been used in the system. Gas phase reactions at elevated temperatures have been utilized. Solvents have been utilized under pressure.

These various processes are characterized by difficulties such as discolored product, poor yields, problems in purification, excessive solvent losses and equipment requirements.

This invention provides an improved method for overcoming these difficulties. The method comprises forming a concentrated solution of phenothiazine in an organic solvent therefor, reacting phosgene with the phenothiazine at a temperature in the range of about 80° to 160° C. and continuously discharging evolved HCl, whereby any undissolved phenothiazine dissolves in the solvent and is substantially completely converted and product phenothiazine-10-carboxylic acid chloride is formed. If desired, the solvent containing any dissolved phenothiazine-10-carboxylic acid chloride can be cooled whereby further product chloride crystallizes out. The chloride may then be separated by filtration, centrifuging, etc.

The organic solvents employed are inert materials which have a minimum boiling point of about 75° C. and preferably one in the range of about 80° to 160° C. and thus include toluene, methyl isobutyl ketone, methyl ethyl ketone, petroleum naphtha, xylene, dioxane, etc. Concentrated solutions of phenothiazine are employed in these solvents, i.e. 20–60 wt. percent concentrations. The term concentrated solutions also connotes slurries in which excess phenothiazine exists as a solid phase in the solvent at conditions employed.

The temperature of reaction with the phosgene is about 80° to 160° C. The phosgene is utilized in an amount of about 1.0 to 1.5 moles based on the phenothiazine. Atmospheric pressure, i.e. 700–800 mm. is utilized and the HCl evolved is continuously removed in a scrubber eliminating the necessity of pressure systems and resulting in economy of operation.

This invention and its advantages will be better understood by reference to the following examples.

*Example 1*

51 g. of purified phenothiazine (0.26 mole) was slurried in 120 cc. methyl isobutyl ketone. 30 grams (0.30 moles) of phosgene were passed into the slurry at 95±5° C. over 2 hours. The mixture was kept at 100° C. for 30 minutes then refluxed for 20 minutes at atmospheric pressure. After cooling and filtration 53 grams (80% yield) of phenothiazine-10-carboxylic acid chloride was obtained. Analysis showed 95% purity. This was an excellent yield of high purity product.

*Example 2*

250 grams (1.24 moles) of phenothiazine was added to 430 grams of toluene. The slurry was heated to 90° C. and 1.5 moles phosgene was added under the liquid over a period of 3 to 5 hours. The color of the solution turned from green to light yellow at the end. The last one-third of the phosgene was added at 100° C. After the phosgene was added, the slurry was kept at 100° to 105° C. for 15 minutes then refluxed at 120° C. for ½ hour to remove excess phosgene. A sample taken at 120° C. when evaporated to dryness gave a crude solid. This crude solid analyzed 96.0% phenothiazine-10-COCl by the Paar chlorine technique, a very high purity of a crude product. Purities of 98% and higher have been similarly achieved.

The crude slurry of the acid chloride, particularly in the aromatic solvents, gives excellent yields on condensation with materials such as dialkylamino alcohols. This avoids the necessity of filtering and handling the acid chloride which is an extremely irritating substance and often produces allergic reactions.

Substituted derivatives of phenothiazine such as the 3-chloro and the phenyl derivatives can be utilized in this invention.

The advantages of this process will be apparent to those skilled in the art. High yields are readily obtained. A product with a crude analysis of 95–100% is obtained directly from the reaction solvent, so that no purification is required and this material can be utilized in subsequent reaction directly in the solvent systems. High product/solvent ratios are used. There is an absence of by-products. Excellent color is obtained immediately compared to the colored products of the art.

It is to be understood that this invention is not limited to the specific examples which have been offered merely as illustrations and that modifications may be made without departing from the spirit of the invention.

What is claimed is:

1. A method of preparing phenothiazine-10-carboxylic acid chloride which consists of forming a concentrated slurry solution of phenothiazine in an inert organic solvent therefor, the solvent having a boiling point of about 80 to 160° C. and being selected from the group consisting of toluene, methyl isobutyl ketone, methyl ethyl ketone, petroleum naphtha, xylene and dioxane; injecting from 1.0–1.5 moles of phosgene per mole of phenothiazine into the phenothiazine slurry-solution at a temperature in the range of about 80–160° C. at atmospheric pressure; continuously discharging evolved HCl leaving phenothiazine-10-carboxylic acid chloride in the organic solvent.

2. The process of claim 1 in which the solvent is methyl isobutyl ketone.

3. The process of claim 1 in which the solvent is toluene.

References Cited in the file of this patent

UNITED STATES PATENTS

| | | |
|---|---|---|
| 2,576,106 | Cusic | Nov. 27, 1951 |
| 2,776,971 | Cusic et al. | Jan. 8, 1957 |
| 2,875,226 | Bloom et al. | Feb. 24, 1959 |

FOREIGN PATENTS

| | | |
|---|---|---|
| 808,050 | Great Britain | Jan. 28, 1959 |
| 515,179 | Canada | Aug. 2, 1955 |
| 1,044,088 | Germany | Nov. 20, 1958 |

OTHER REFERENCES

Paschkowezky: Ber. d. Deut. Chem. Ges., vol. 24, part III, pages 2905–7 (1891).

Dahlbom et al.: Acta Chemica Scandinavica, vol. 5, pages 103 and 107–108 (1951).

Dahlbom: Acta Chemica Scandinavica, vol. 7, page 882 (1953).